United States Patent [19]

Landgraf et al.

[11] 4,376,971
[45] Mar. 15, 1983

[54] SYSTEM FOR PROTECTION AGAINST GETTING CAUGHT IN AUTOMATICALLY OPERABLE DOORS OR WINDOWS, PARTICULARLY OF VEHICLES

[75] Inventors: Hans Landgraf, Obermöllrich; Joachim Dörner, Kassel; Siegfried Heinrich, Edermunde; Manfred Horn, Kaufungen, all of Fed. Rep. of Germany

[73] Assignee: Gebr. Bode & Co., Kassel, Fed. Rep. of Germany

[21] Appl. No.: 228,835

[22] Filed: Jan. 27, 1981

[30] Foreign Application Priority Data

Feb. 2, 1980 [DE] Fed. Rep. of Germany ....... 3003877

[51] Int. Cl.³ ............................................. G06F 15/20
[52] U.S. Cl. ...................................... 364/184; 49/28; 49/31; 187/31
[58] Field of Search ........................ 364/130, 184, 561; 324/207, 208; 250/561; 200/61.62, 61.72; 187/31; 49/26, 28, 29, 31

[56] References Cited

U.S. PATENT DOCUMENTS

| | | | |
|---|---|---|---|
| 3,531,800 | 9/1970 | Brescia | 364/561 X |
| 4,068,163 | 1/1978 | Foxworthy | 324/207 |
| 4,131,830 | 12/1978 | Lee et al. | 49/28 X |
| 4,261,440 | 4/1981 | Jacoby | 49/28 X |
| 4,263,746 | 4/1981 | Eller et al. | 49/28 |

Primary Examiner—Jerry Smith
Attorney, Agent, or Firm—Sprung, Horn, Kramer & Woods

[57] ABSTRACT

A system for protection against getting caught in automatically operable doors or windows, particularly of vehicles. Specific intervals of time within which the closing or opening door should reach a given position are preset. When the door does not reach one of these positions within the time allowed, the reversing motion is initiated or the cycle of motions is stopped. For this purpose, an electric signal generator coupled to the door motion delivers electric position signals when predetermined positions of the door are reached. An electric storage element is set by the position signals and after a predetermined time interval automatically reset, with the logic value of its output signal changing. The output signal of the storage element and an extreme-position signal produced by limit switches coupled to the door are fed to a logic circuit which delivers a control signal when the output signal of the storage element has the value occurring upon the latter's being reset and the extreme-position signal has the value corresponding to an intermediate position of the door. The control signal is fed to a mechanism for stopping or reversing the door motion.

8 Claims, 5 Drawing Figures

|   | A | B | C | 0 | 1 | 2 | 3 | 4 | 5 | 6 | 7 |
|---|---|---|---|---|---|---|---|---|---|---|---|
| 1 | 0 | 0 | 0 | 1 | 0 | 0 | 0 | 0 | 0 | 0 | 0 |
| 2 | 1 | 0 | 0 | 0 | 1 | 0 | 0 | 0 | 0 | 0 | 0 |
| 3 | 0 | 1 | 0 | 0 | 0 | 1 | 0 | 0 | 0 | 0 | 0 |
| 4 | 1 | 1 | 0 | 0 | 0 | 0 | 1 | 0 | 0 | 0 | 0 |
| 5 | 0 | 0 | 1 | 0 | 0 | 0 | 0 | 1 | 0 | 0 | 0 |
| 6 | 1 | 0 | 1 | 0 | 0 | 0 | 0 | 0 | 1 | 0 | 0 |
| 7 | 0 | 1 | 1 | 0 | 0 | 0 | 0 | 0 | 0 | 1 | 0 |
| 8 | 1 | 1 | 1 | 0 | 0 | 0 | 0 | 0 | 0 | 0 | 1 |

SYSTEM FOR PROTECTION AGAINST GETTING CAUGHT IN AUTOMATICALLY OPERABLE DOORS OR WINDOWS, PARTICULARLY OF VEHICLES

BACKGROUND OF THE INVENTION

The invention has as its object an anti-catching system for protection against getting caught in automatically operable closures such as doors or windows, particularly of vehicles.

Various systems for protection against getting caught in automatically operable doors are known.

For example, it is known, especially in connection with elevator doors, to provide parallel to the closing path of the doors an electric eye which then reacts to an object or a person located between the doors and triggers a stop or reverse motion. However, such systems are not always reliable since electric eyes cannot be placed so that they will unfailingly detect every obstruction, except at considerable expenditure.

Moreover, there are systems in which the door motion is reversed in that when a door is being held there is formed in a pneumatic system actuating the door a certain pressure difference which triggers an appropriate control action if a predetermined threshold value is reached. With such systems, however, considerable counterpressure must usually be overcome by the person wedged in before the reversing motion is initiated, which is considered a nuisance and may also endanger a person so caught.

Finally, there are systems, especially on the doors of vehicles such as buses, trolleys, etc., where the rubber gaskets disposed along the door edges are provided with electric limit switches which trigger the control action for reversing the door motion when pressure is exerted on the rubber gasket. However, since these delicate limit switches are located at exposed points, such systems are apt to malfunction and therefore do not provide the desired security.

SUMMARY OF THE INVENTION

The object of the invention thus is to provide a protective system of this type which while highly reliable in operation is not particularly complex and which, moreover, is readily serviced, is not likely to malfunction, and is flexible in use. In addition, the system is to permit the door motion to be stopped or reversed both in closing and in opening.

The principle underlying the invention is to preset specific intervals of time within which the closing or opening door should reach a given position. If it does not reach one of these positions within the time allowed because someone or something got caught in it, the door is reversed or the cycle of door motions is stopped.

The object of the invention is accomplished in accordance with this principle by means of a system which comprises the following individual components:

an electric signal generator which is coupled to the door or the door drive and transmits an electric position signal whenever predetermined door positions are reached;

at least one electric storage element which is set by at least one of the successive position signals and is reset automatically after a preset time interval, and whose output signal upon such resetting changes in value from logic "1" to logic "0" or from logic "0" to logic "1;"

a logic circuit to which are fed, on the one hand, the output signal of the storage element or the output signals of the storage elements, respectively, and, on the other hand, an extreme-position signal delivered by limit switches coupled to the door which indicates whether an extreme position of the door has been reached, said circuit delivering a control signal when the output signal of the storage element or the output signals of all storage elements have the value occurring upon their being reset and the extreme-position signal has the value which corresponds to one of the intermediate positions of the door; and means for stopping and/or reversing the door motion to which said control signal is fed.

Advantageous embodiments of the system in accordance with the invention are described hereinafter.

Thus, widely differing devices which as such are known may be used as electric signal generators for transmission of the position signals. Noncontact switching means such as those known as reed switches, which are actuated by means of permanent magnets, and photoelectric control units employing perforated disks have proved particularly advantageous.

The electric storage elements used are preferably monostable multivibrators in which the time constant for resetting can be preselected through internal or external circuitry. Of course, other storage elements such as Schmitt triggers may also be employed.

The simplest embodiment of the system in accordance with the invention comprises an electric storage element to whose set input the position signals are continually fed and whose output is connected by way of the logic circuit to the means for reversing or stopping the door motion, the storage element being set anew by every new incoming position signal, and reversing being initiated when resetting occurs and the extreme-position signal does not indicate at the same time that the door motion has been properly completed, that is to say, that the door is fully closed or fully open.

However, it has been found advisable to use a plurality of electric storage elements for the system in accordance with the invention.

In another embodiment, two storage elements are used, the position signals being continually fed to the first storage element, with the first storage element upon being reset setting a second storage element, reversing of the door motion being initiated only when both storage elements have been reset before the next position signal arrives and the signal indicating the extreme position of the door is not simultaneously received. As will be shown further on with reference to a further embodiment, such a system is more flexible in its application, particularly with regard to its tolerance of differences in the closing time of a door due to weather conditions, for example. This embodiment has the advantage of pronounced flexibility and simplicity with respect to its adjustability, particularly when electric storage elements are used which can be set anew only after they have been reset, as is the case with monostable multivibrators, since the second storage element delivers the output signal preventing the initiation of reversing as the first storage element is being set anew.

Especially for use with doors whose closing motion is based on a nonlinear path/time function, embodiments of the system in accordance with the invention which comprise more than two electric storage elements have proved particularly advantageous. This is true especially of embodiments in which a separate storage element is associated not only with the start signal initiating the door motion but also with each incoming position signal. Each of these storage elements should have a time constant which can be set to a predetermined value. By appropriate individual selection of the time constants, the response of the system can be precisely adjusted to the predetermined closing motion of the door.

BRIEF DESCRIPTION OF THE DRAWINGS

The system in accordance with the invention will now be described in greater detail with reference to embodiments illustrated in the accompanying drawings, wherein.

DETAILED DESCRIPTION OF THE INVENTION

Figure 1:
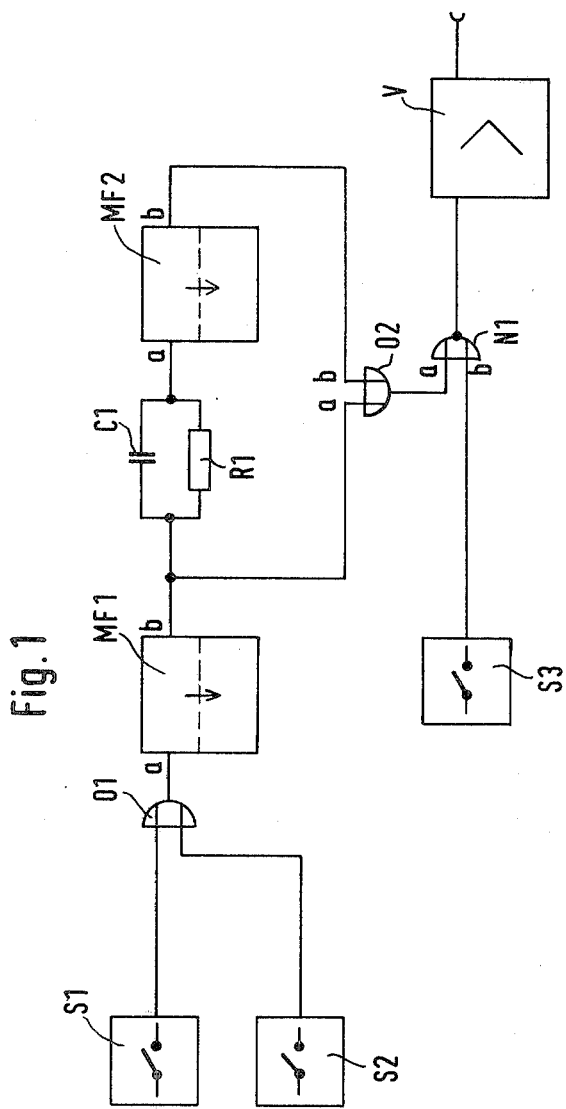
FIG. 1 is a block diagram of a first embodiment of a system in accordance with the invention.

The block diagram of FIG. 1 shows only the circuit components absolutely necessary to an understanding of the system. Conventional components such as means for generating and supplying operating voltages, and possible circuitry for the external setting of time constants, are not specifically represented.

In FIG. 1, S1 designates a switching means, shown symbolically, consisting of a signal generator which is coupled to the door or door drive in a manner that is not shown and which at specific predetermined door positions transmits a signal. If necessary, the signal generator may be followed by conventional circuit components for generation and processing of electric pulses. S2 denotes a switching means whereby the closing of the door is initiated, as by the driver of a vehicle, for example. The switching means S1 and S2 are constructed to suppress a continuous signal and to transmit only discrete pulses, which by way of an OR circuit O1 are fed to the set input "a" of a monostable multivibrator MF1. The output "b" of the monostable multivibrator is connected through a differentiating network R1 and C1 to the set input "a" of a second monostable multivibrator MF2. The outputs "b" of the two monostable multivibrators MF1 and MF2 are further connected to the inputs "a" and "b," respectively, of an OR circuit O2 whose output is connected to the input "a" of a NOR circuit N1. The other input, "b," of the NOR circuit N1 is connected to a further switching means S3 which delivers a signal indicating whether an extreme position of the door, in other words, fully closed or fully opened, has been reached. The switching means S3 can also be actuated by limit switches coupled to the door or door drive. The output of the NOR circuit N1 is connected to an output stage V at whose output a control signal is available for the actuation of devices which are not shown and which may be reversing valves, for example, for controlling the door motion.

The monostable multivibrators MF1 and MF2 are designed so that when set a signal having the value logic "1," and when reset a signal having the value logic "0," appears at their outputs "b." The time constant for the resetting of the two monostable multivibrators is individually selectable.

Figures 2, 5:
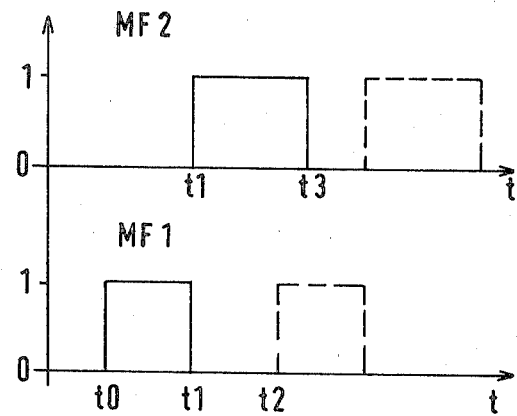
FIG. 2 is a diagrammatic representation of the response of the storage elements in a system according to FIG. 1.
FIG. 5 is a function table illustrating the decoding of the position signals in a system according to FIG. 4.

As is apparent from FIG. 2, the time constant is selected so that MF1 is set at time t0, for example, and automatically reset at time t1. The resetting of MF1 causes simultaneously the setting of MF2 at time t1. The resetting of MF2 occurs at time t3. The time intervals t1 to t0 and t3 to t1 are selected so that their sum is greater than the time interval between the position signals which are produced during a normal closing or opening motion of the door and which arrive from the switching means S1, and through which MF1 is set anew at time t2, for example. This means that in the normal closing or opening of the door one of the two monostable multivibrators MF1 and MF2 is always in the set condition and therefore delivers at its output the signal "1." This in turn means that in this normal case the value "1" always appears at one of the two inputs of the OR circuit O2, and hence at the input "a" of the NOR circuit N1. The value "0" appears at the output of the NOR circuit N1 whenever the value "1" appears at one of the inputs. Thus, during the normal closing motion of the door no signal is transmitted to the output stage V, and therefore no control signal triggering the reversing motion is delivered. Now when the motion of the door is impeded by someone or something caught in it, one of the position-signal pulses to be transmitted by S1 is missing or appears with great delay. This means that the multivibrator MF1 will not be set anew until after the multivibrator MF2 has been reset. The resulting condition is such that the value "0" appears at the outputs "b" of both multivibrators MF1 and MF2, as a result of which the value "0" appears at the input "a" of the NOR circuit N1, as is apparent from FIG. 1. The switching means S3 is designed so that it will deliver the value "0" when the door is in an intermediate position whereas it will deliver the value "1" when the door has reached its extreme position. This means that when someone or something is caught in the door the value "0" appears at both inputs of the NOR circuit N1, and hence at its output the value "1," which through the output stage V triggers the reversing of the door motion. When the door has finally opened or closed, the signal delivered by S3 changes from "0" to "1." In this case no reversing signal is produced even when both multivibrators MF1 and MF2 have been reset so that the value "0" appears at the other input of the NOR circuit. MF1 is initially set by the switching means S2 at the same time that the closing or opening of the door is initiated. This further bridges the initial path up to the transmission of the first pulse by S1.

The circuit shown in FIG. 1 will always deliver a control signal triggering the reversing of the door motion when the latter is impeded before one of the two extreme positions of the door has been reached.

The logic circuit of the embodiment according to FIG. 1, formed by the two circuit components O2 and N1, overall has a triple NOR function. Of course, this circuit may, in principle, also be designed differently, for example, when the signals which trigger reversing have the value logic "1." In that case, the NOR function is replaced by an AND function.

Figure 3:
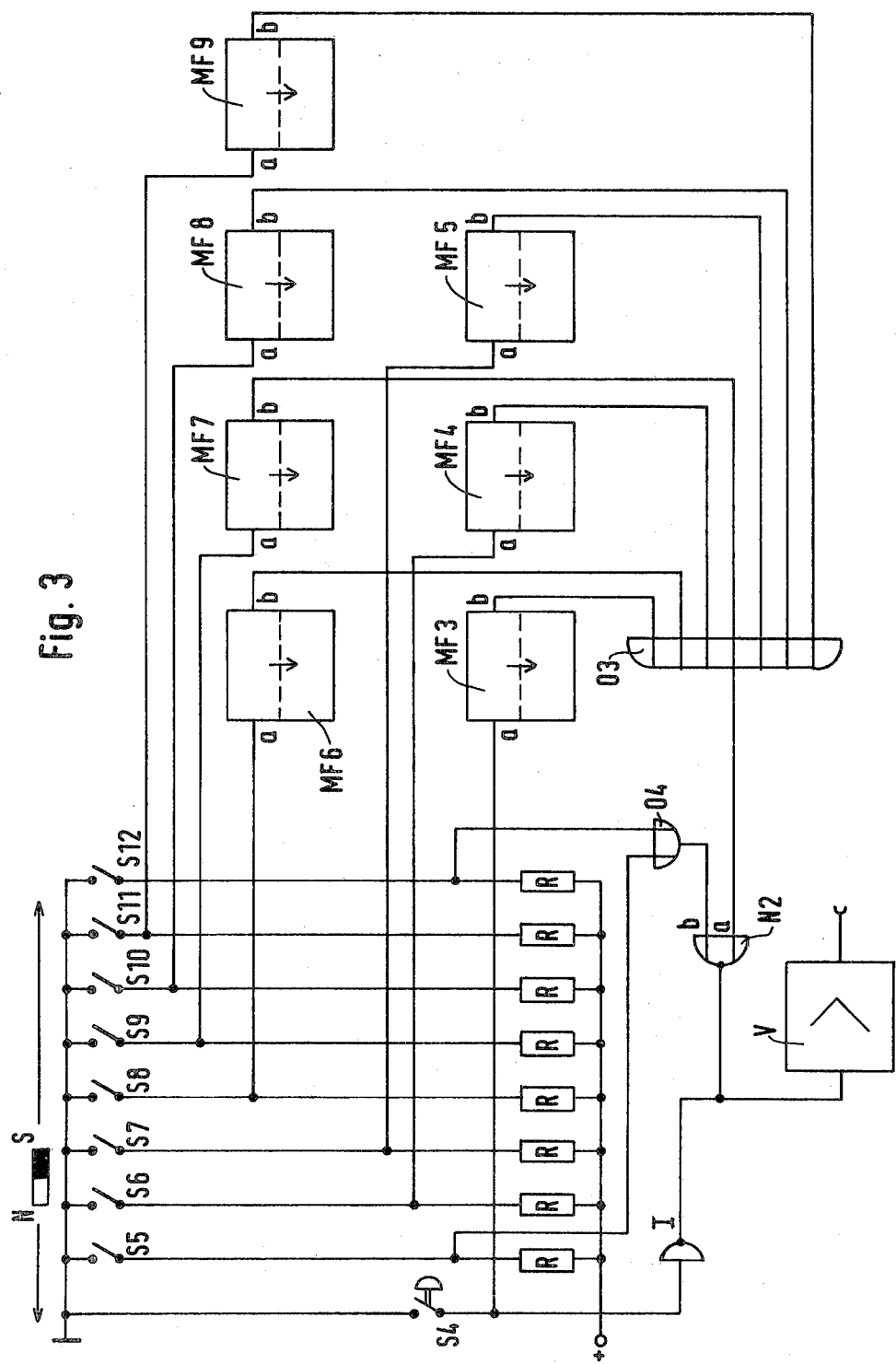
FIG. 3 is a circuit diagram of a further embodiment of a system in accordance with the invention.

In the embodiment according to FIG. 3, a total of seven monostable multivibrators MF3 to MF9 is used. In each of these multivibrators the time constant for resetting is selectable in a manner not shown. The start signal for the closing or opening motion of the door is delivered by a switching means S4. As is readily apparent from the drawing, said starting signal is transmitted by way of an inverter I to the input of the output stage V for generation of a control signal for the means (not shown) for actuating the closing or opening of the door. From S4 the start signal is further fed to the set input "a" of the first monostable multivibrator MF3. The circuit includes, moreover, a reed switch comprising the contacts S5 to S12 which is adapted to be actuated by a permanent magnet NS that is mechanically coupled to the door. The first and last contacts S5 and S12, respectively, of that reed switch furnish the two extreme-position signals for the door motion. The contacts S6 to S11 produce the position signals. For this purpose, each of the contacts S6 to S11 is connected to one of the set inputs "a" of the monostable multivibrators MF4 to MF9 in a manner apparent from the drawing. The outputs "b" of all multivibrators MF3 to MF9 are connected to the inputs of a seven-way OR circuit O3 whose output is connected to one input, "a," of a NOR circuit N2. The two contacts S5 and S12 are connected by way of an OR circuit O4 to the other input, "b," of the NOR circuit N2. The output of the NOR circuit N2 is connected to the output stage V for generation of the control signal. The time constants of the monostable multivibrators MF3 to MF9 are selected so that when the closing or opening of the door proceeds normally the next position signal from one of the contacts S6 to 11 arrives at the set input of the multivibrator associated with that contact before the preceding multivibrator is reset. The value "1" therefore appears at least at one input of the OR circuit O3 when the door motion takes its normal course, with the result that the value "1" appears also at the input "a" of the NOR circuit N2 and that the value "0" is delivered by the output of said NOR circuit N2. When the motion of the door is impeded by someone or something caught in it, the generation of the next position signal is delayed, and the corresponding multivibrator therefore is set only after the preceding multivibrator has been reset. In this case, the value "0" appears at all inputs of the OR circuit O3, and consequently also at the input "a" of the NOR circuit N2. In all intermediate positions of the door, in other words, before one of the extreme positions of the door is reached, signals having the value "0" are transmitted by the contacts S5 and S12 by way of O4 to the input "b" of N2. As a result, the value "1" appears at the output of the NOR circuit N2 when someone or something has gotten caught in the door, and the control signal triggering reversing is delivered, as is readily apparent.

With the door in one of its extreme positions, signals having the value "1" are transmitted by one of the two contacts S5 and S12 by way of O4 to the other input, "b," of N2. In this case, no reversing signal is delivered, and this is true also when the value "0" appears at the input "a" of N2.

The special advantage of the embodiment according to FIG. 3 is that the time constants of the monostable multivibrators MF3 to MF9 can be selected individually so that the entire system is readily adaptable to different closing motions, which need not conform to a linear path/time function.

In the embodiment according to FIG. 3, too, the special design of the logic circuit formed by the components O3, O4 and N2 is, of course, closely tied to the circuitry of the storage elements. Here, too, a logic circuit may be used which in place of a NOR function has an AND function when the signals triggering the control action have a value of logic "1."

Figure 4:
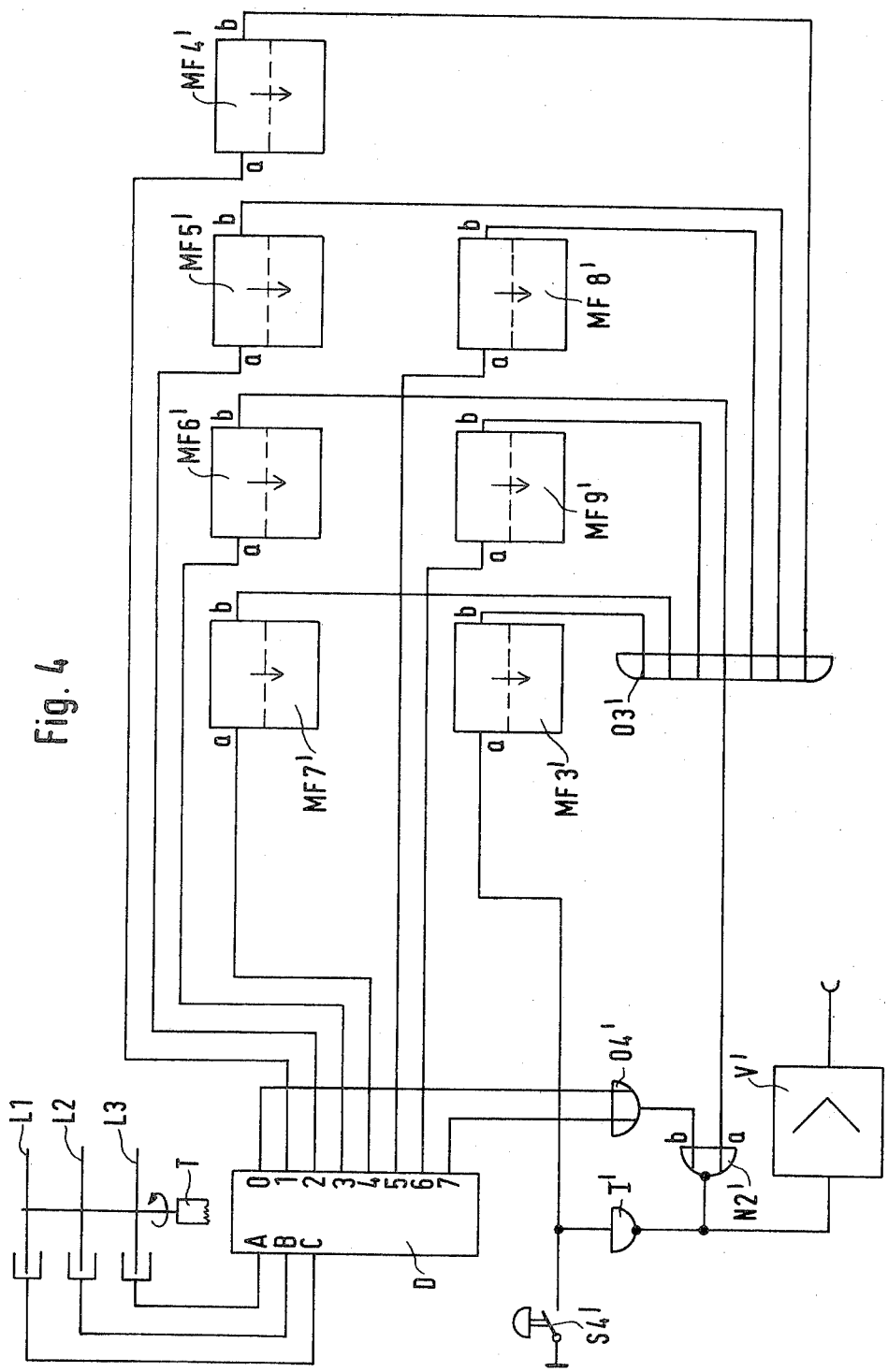
FIG. 4 shows a modification of the embodiment according to FIG. 3 comprising a different type of signal generator.

Shown in FIG. 4 is a modification of the embodiment according to FIG. 3 which differs from the latter particularly with respect to the generation of the position signals. The system again comprises a total of seven monostable multivibrators MF3' to MF9'.

From the switch S4' the start signal is again transmitted by way of the NOT circuit I' to the output stage V' and a pulse is transmitted to the set input "a" of the first multivibrator MF3'. The set inputs "a" of the other multivibrators, MF4' to MF9', are connected to the outputs 1 to 6 of a decoder D whose inputs A, B and C are each connected to one of the outputs of a three-way fork-type photoelectric control unit L1, L2 and L3. The latter is pulsed by means of rotatable perforated disks or of a linear apertured mask secured to a rotatable part of the door drive, for example, the door column. The signals delivered by the photoelectric control unit in the BCD code are converted by means of the decoder D into signals corresponding to a decimal code. This conversion is illustrated by the function table of FIG. 5. The perforation of the three superposed perforated disks is such that in the various positions of the door signals are generated which correspond to the first three columns of the function table according to FIG. 5. Positions 1 and 8 in that function table correspond to the two extreme positions of the door while positions 2 to 7 correspond to the intermediate positions. It is readily apparent from FIG. 5 what signals are transmitted in which positions to the set inputs "a" of the multivibrators MF4' to MF9'. The outputs "b" of the multivibrators are connected by way of a seven-way OR circuit O3' to one of the inputs, "a," of a NOR circuit N2'. The outputs 0 and 7 of the decoder D are connected by way of an OR circuit O4' to the other input, "b," of the NOR circuit N2'.

The principle of operation of the circuit according to FIG. 4 is readily apparent from FIGS. 4 and 5.

As soon as a delay occurs in the closing or opening motion of the door, the circuit is placed in a condition in which all multivibrators MF3' to MF9' are reset in accordance with the time constants selected for the multivibrators. In this case, a signal having the value "0" appears at the outputs of all these multivibrators, and the value "0" consequently is also applied to the input "a" of the NOR circuit N2' by way of O3'. Now unless the value "1" indicating that the extreme position of the door has already been reached is transmitted from the outputs 0 and 7 of the decoder D by way of the OR circuit O4' to the other input, "b," of the NOR circuit N2', the value "0" appears at the output N2' to trigger reversing.

In the two circuits shown in FIGS. 3 and 4, the opening or closing motion of the door can be immediately reversed by means of the "operator's contact" S4 or S4', respectively.

It will be appreciated that the instant specification and claims are set forth by way of illustration and not of limitation, and that various changes and modifications may be made without departing from the spirit and scope of the present invention.

What is claimed is:

1. In an automatically operable closure, the improvement comprising an anti-catching system for protection against getting caught during the closing of the closure, the system comprising:

means responsive to the movement of the closure for generating an electric position signal whenever predetermined closure positions are reached and including means for generating an extreme-position signal to indicate when an extreme position of the closure has been reached;

at least one electric digital storage element set by at least one of the successive position signals and reset automatically after a preset time interval thereby changing the logic state of the output thereof;

logic circuit means receptive of the output of the at least one storage element and the extreme-position signal for producing a control signal when the output signal of the at least one storage element has an output value corresponding to the reset state and the extreme-position signal has a value corresponding to the closure being in an intermediate position; and means responsive to the control signal for at least one of stopping and reversing the motion of the closure.

2. The system according to claim 1, wherein the position signal generating means comprises magnetically actuatable switching means having a plurality of contacts arranged along a straight-line path and a permanent magnet movable with the closure along said path during the closing motion of the closure.

3. The system according to claim 1, wherein the position signal generating means comprises at least one fork-type photoelectric control unit including a perforated disk rotatable in response to movement of the closure.

4. The system according to claim 1, 2 or 3, wherein the electric storage element comprises a monostable multivibrator with a presettable time constant.

5. The system according to claim 1, further comprising two electric storage elements with the output of the first fed via a differentiating network to the input of the second, means for generating a start signal at the start of the closure motion, means for applying the start signal and the position signals to the input of the first storage element, wherein the time constants of the two storage elements are set so that with unimpeded closure motion the first storage element is reset before, and the second storage element is reset after, the generation of the next position signal, and wherein the logic circuit means is receptive of the outputs of the two storage elements and the extreme-position signal to generate the control signal when the two storage elements are reset and the closure is not in an extreme position.

6. The system according to claim 5, wherein the outputs of the storage elements in the reset condition are logic "0" signals and the logic circuit means comprises a two-input OR circuit receptive of the output signals of the storage elements and a two-input NOR circuit receptive of the output of the OR circuit and the extreme-position signal, which in the intermediate positions of the closure has a logic "0" value.

7. The system according to claim 1, further comprising more than two electric storage elements, and means for generating a start signal at the start of the closure motion, wherein the first storage element is receptive at its input of the start signal and each of the further storage elements is receptive at its set input of one subsequent different position signals, the time constants of the storage elements selected so that with unimpeded door motion each storage element is reset only after the next storage element has been set, and wherein the logic circuit means is receptive of the outputs of all of the storage elements for producing the control signal when all of the storage elements are reset and the extreme-position signal indicates the closure is in an intermediate position.

8. The system according to claim 7, wherein the outputs of all of the storage elements in the reset state deliver a logic "0" signal and the logic circuit means comprises a multiple OR circuit to whose inputs the output signals of the storage elements are fed and a NOR circuit having one input connected to the output of the OR circuit and another input receptive of the extreme-position signal, which in the intermediate position of the closure has the value of logic "0."

* * * * *